(12) United States Patent
Kaneiwa et al.

(10) Patent No.: US 9,590,461 B2
(45) Date of Patent: Mar. 7, 2017

(54) ROTARY ELECTRIC MACHINE

(71) Applicant: DENSO CORPORATION, Kariya, Aichi-pref. (JP)

(72) Inventors: Hiroshi Kaneiwa, Kariya (JP); Yuuichirou Itou, Anjo (JP); Atsushi Jitsumatsu, Kariya (JP)

(73) Assignee: DENSO CORPORATION, Kariya (JP)

( * ) Notice: Subject to any disclaimer, the term of this patent is extended or adjusted under 35 U.S.C. 154(b) by 479 days.

(21) Appl. No.: 14/012,396

(22) Filed: Aug. 28, 2013

(65) Prior Publication Data
US 2014/0062250 A1 Mar. 6, 2014

(30) Foreign Application Priority Data

Aug. 29, 2012 (JP) .................... 2012-188892

(51) Int. Cl.
*H02K 3/34* (2006.01)
(52) U.S. Cl.
CPC .......... *H02K 3/345* (2013.01); *H02K 2213/03* (2013.01)
(58) Field of Classification Search
CPC ...... H02K 3/345; H02K 3/34; H02K 15/0018; H02K 15/10; H02K 15/105; H02K 2213/03; H02K 3/32; H02K 3/12; H02K 3/30; H02K 3/46
USPC ...... 310/215, 214, 216.095, 216.132; 29/596
See application file for complete search history.

(56) References Cited

U.S. PATENT DOCUMENTS

| | | | |
|---|---|---|---|
| 1,695,862 A | * | 12/1928 | Sandfield ............... H02K 3/345 310/215 |
| 6,147,430 A | * | 11/2000 | Kusase ................. H02K 1/165 310/201 |
| 6,208,060 B1 | | 3/2001 | Kusase et al. |
| 6,242,836 B1 | | 6/2001 | Ishida et al. |
| 6,335,583 B1 | | 1/2002 | Kusase et al. |

(Continued)

FOREIGN PATENT DOCUMENTS

| | | |
|---|---|---|
| JP | 2000-050553 | 2/2000 |
| JP | 2001-178057 | 6/2001 |

(Continued)

OTHER PUBLICATIONS

Office Action (2 pages) dated Nov. 26, 2015, issued in corresponding Japanese Application No. 2012-188892 and English translation (3 pages).

*Primary Examiner* — Michael Andrews
*Assistant Examiner* — Noli Manaloto
(74) *Attorney, Agent, or Firm* — Nixon & Vanderhye P.C.

(57) ABSTRACT

A rotating electric machine includes a rotor, and a stator that has a stator core and a stator winding. The stator core has a plurality of slots. The stator winding is wound around the stator core as a plurality of electrical conductors is aligned in the radial direction in the slots. The stator has an insulating sheet member that is bent in a rectangular cylindrical shape, and is intervened between the electrical conductor and an inner wall surface of the slot. A length of a bend line formed extending in the axial direction on the insulating sheet member from a reference position in a central section of the insulating sheet member in the axial direction to a tip in the axial direction is configured shorter than a length from the reference position to an end in the axial direction of the sheet member.

6 Claims, 10 Drawing Sheets

(56) References Cited

U.S. PATENT DOCUMENTS

2004/0183391 A1* 9/2004 Kimura ................ H02K 3/345
 310/215
2011/0204742 A1* 8/2011 Nakayama ............ H02K 3/345
 310/215

FOREIGN PATENT DOCUMENTS

| JP | 2002-199641 | 7/2002 |
| JP | 3351387 | 9/2002 |
| JP | 2005-185008 | 7/2005 |
| JP | 2008-289284 | 11/2008 |

* cited by examiner

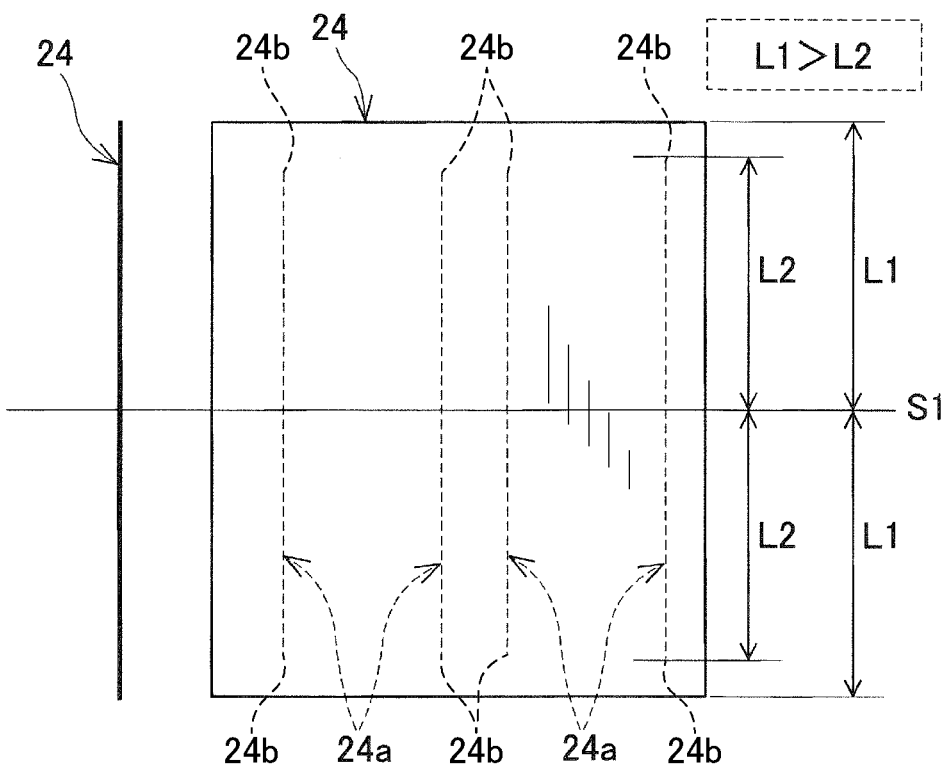

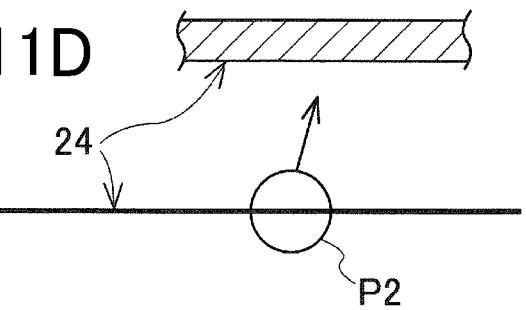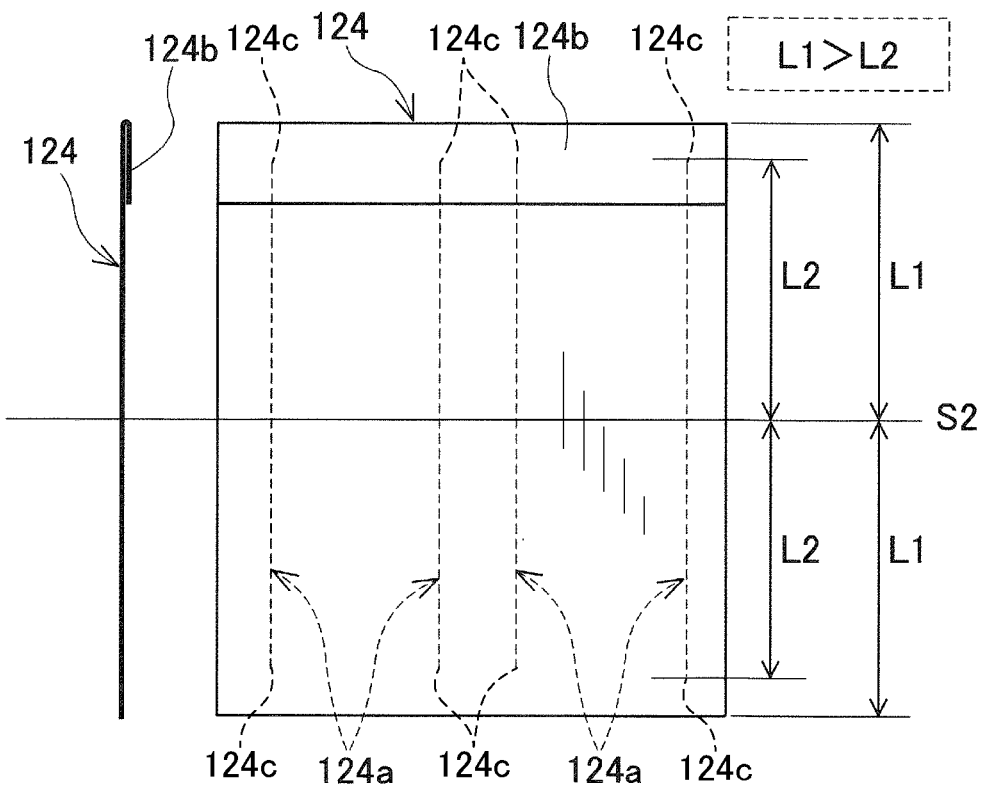
FIG.11D
FIG.11C
FIG.11B  FIG.11A

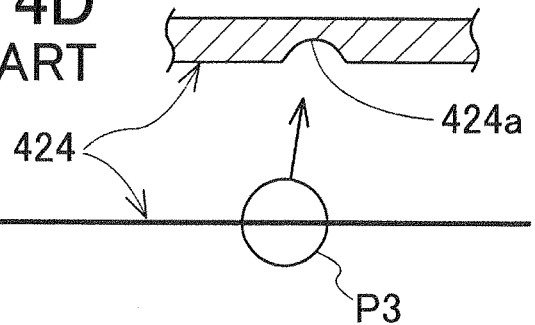
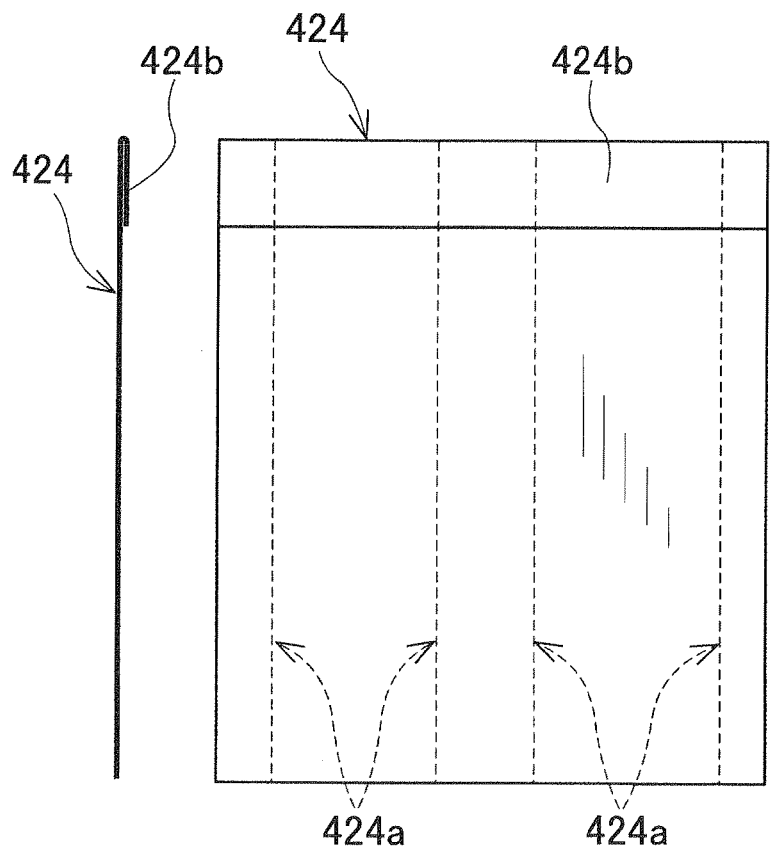
FIG.14D PRIOR ART
FIG.14C PRIOR ART
FIG.14B PRIOR ART
FIG.14A PRIOR ART

ROTARY ELECTRIC MACHINE

CROSS-REFERENCE TO RELATED APPLICATION

The application is based on and claims the benefit of priority from earlier Japanese Patent Application No. 2012-188892 filed Aug. 29, 2012, the description of which is incorporated herein by reference.

TECHNICAL FIELD

The present disclosure relates to a rotary electric machine used as a generator or an electric motor installed in a vehicle or the like.

BACKGROUND

Conventionally, a rotating electrical machine that has an annular stator core having a plurality of slots arranged in a circumferential direction, a stator winding wound around the stator core as a plurality of electrical conductors is aligned in the radial direction in the slots, and an insulating sheet member intervened between inner wall surfaces of the slots and the electrical conductors is known.

In addition, as shown in FIG. 14A to FIG. 14D of the present disclosure, for example, a single insulating sheet member 424 bent in a rectangular cylindrical shape to match a sectional shape of a slot is disclosed in Japanese Patent Application Laid-Open Publication No. 3351387.

Bend lines 424a extending in an axial direction are formed in advance by pressing an edge of a cutting tool, for example, onto the insulating sheet member 424, and the insulating sheet member 424 is folded along the bend lines 424a to form the rectangular cylindrical shape.

In this case, the bend lines 424a are formed so as to reach axial ends (i.e., ends in the axial direction) of the insulating sheet member 424.

The insulating sheet member 424 being folded in the rectangular cylindrical shape in this way is disposed so that both axial ends protrude from an end surface in the axial direction of a stator core to outside the slot.

Further, in order to prevent the insulating sheet member 424 disposed in the slot from detaching in the axial direction, as shown in FIG. 14A to FIG. 14D, a folded portion 424b folded back in the axial direction formed in the axial end of the insulating sheet member 424 is disclosed in the Publication '387.

Incidentally, in the rotary electric machine disclosed in the above Publication '387, obliquely passing sections are formed by bending in a circumferential direction electrical conductors extending outside slots from end surfaces in the axial direction of a stator core in coil end portions formed on both sides of the stator core in the axial direction.

Therefore, tears occur easily starting from the bend lines 424a by being pulled by the electrical conductor that has been folded especially in the corners in the axial ends of the insulating sheet member 424 that protrude outside the slots from the end surface in the axial direction of the stator core.

If the tears occur in this manner, the tears may progress inside the slot, or a distance between the stator winding and the stator core becomes insufficient, thus it becomes impossible to secure sufficient insulation.

SUMMARY

An embodiment provides a rotary electric machine that is capable of preventing an occurrence of tears in both ends in an axial direction of an insulating sheet member disposed in a slot of a stator core.

In a rotating electric machine according to a first aspect, the rotating electric machine includes a rotor, and a stator that has a stator core and a stator winding. The stator core is disposed in a radial direction facing the rotor and has a plurality of slots extending in an axial direction, and arranged in a circumferential direction. The stator winding is wound around the stator core as a plurality of electrical conductors and is aligned in the radial direction in the slots.

The stator has an insulating sheet member that is bent in a rectangular cylindrical shape to match a sectional shape of the slot, and is intervened between the electrical conductor and an inner wall surface of the slot.

A length of a bend line formed extending in the axial direction on the insulating sheet member from a reference position in a central section of the insulating sheet member in the axial direction to a tip in the axial direction is configured shorter than a length from the reference position to an end in the axial direction of the sheet member.

According to the present disclosure, the length of the bend line formed extending in the axial direction on the insulating sheet member from a reference position in a central section of the insulating sheet member in the axial direction to a tip in the axial direction is configured shorter than the length from the reference position to an end in the axial direction of the sheet member.

That is, since the bend lines extending in the axial direction formed on the insulating sheet member do not reach the both ends in the axial direction of the insulating sheet member, the bend line that might become an origin of a tear when a tear occurs is prevented from being formed on the both ends in the axial direction of the insulating sheet member.

Therefore, the occurrence of the tears in both ends in the axial direction of the insulating sheet member is prevented more reliably, and good insulation by the insulating sheet member is ensured more reliably.

In the rotating electric machine according to a second aspect, the length of the bend lines in the axial direction is the same as a length of the stator core in the axial direction.

In the rotating electric machine according to a third aspect, the insulating sheet member has a folded portion folded back in the axial direction formed in at least one end in the axial direction of the insulating sheet member.

In the rotating electric machine according to a fourth aspect, the bend line is formed separately into a plurality of bend lines in the axial direction, and the bend lines are spaced apart in the axial direction from each other.

In addition, it is possible to employ an insulating paper, a plastic sheet, ceramic sheet, or a composite sheet obtained by laminating them or the like as the insulating sheet member in the present disclosure.

BRIEF DESCRIPTION OF THE DRAWINGS

In the accompanying drawings:

FIG. 8A shows a plan view of an insulating sheet member used in the first embodiment;

FIG. 8B shows a side view of the insulating sheet member used in the first embodiment;

FIG. 8C shows a top view of the insulating sheet member used in the first embodiment;

FIG. 8D shows an enlarged view of a portion P1 in FIG. 8C

FIG. 11A shows a plan view of an insulating sheet member used in a second embodiment;

FIG. 11B shows a side view of the insulating sheet member used in the second embodiment;

FIG. 11C shows a top view of the insulating sheet member used in the second embodiment;

FIG. 11D shows an enlarged view of a portion P2 in FIG. 11C;

FIG. 14A shows a plan view of a conventional insulating sheet member;

FIG. 14B shows a side view of the conventional insulating sheet member;

FIG. 14C shows a top view of the conventional insulating sheet member; and

FIG. 14D shows an enlarged view of a portion P3 in FIG. 14C.

DETAILED DESCRIPTION OF THE PREFERRED EMBODIMENTS

Hereinafter, embodiments of a rotating electric machine according to the present disclosure will be described in detail with reference to the drawings.

[First Embodiment]

A rotating electric machine 1 according to the present embodiment is intended to be used as an AC (alternating current) generator (or alternator) for a vehicle.

Figure 1:
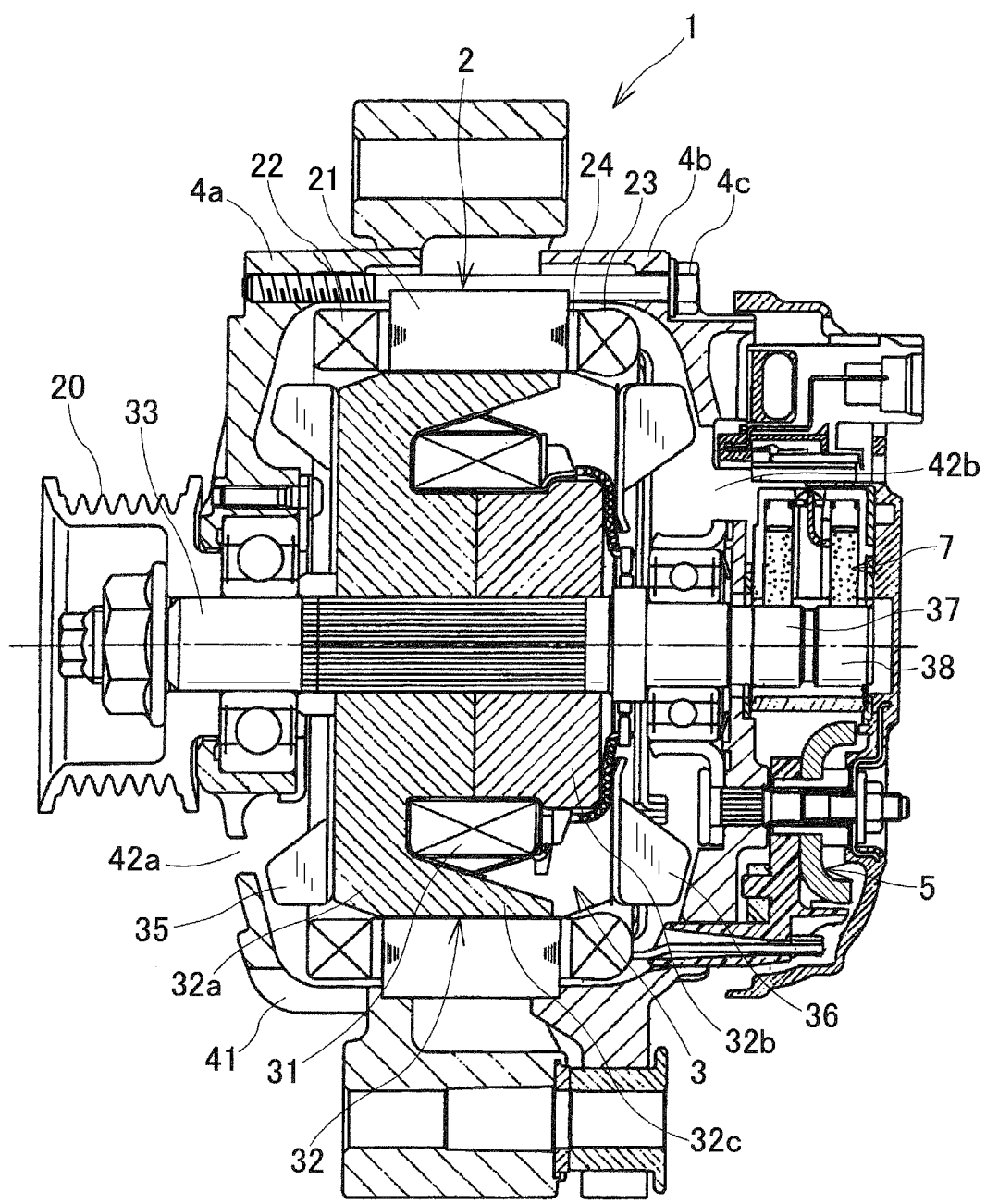
FIG. 1 shows a cross-sectional view in an axial direction of a rotary electric machine in a first embodiment.
Figure 2:
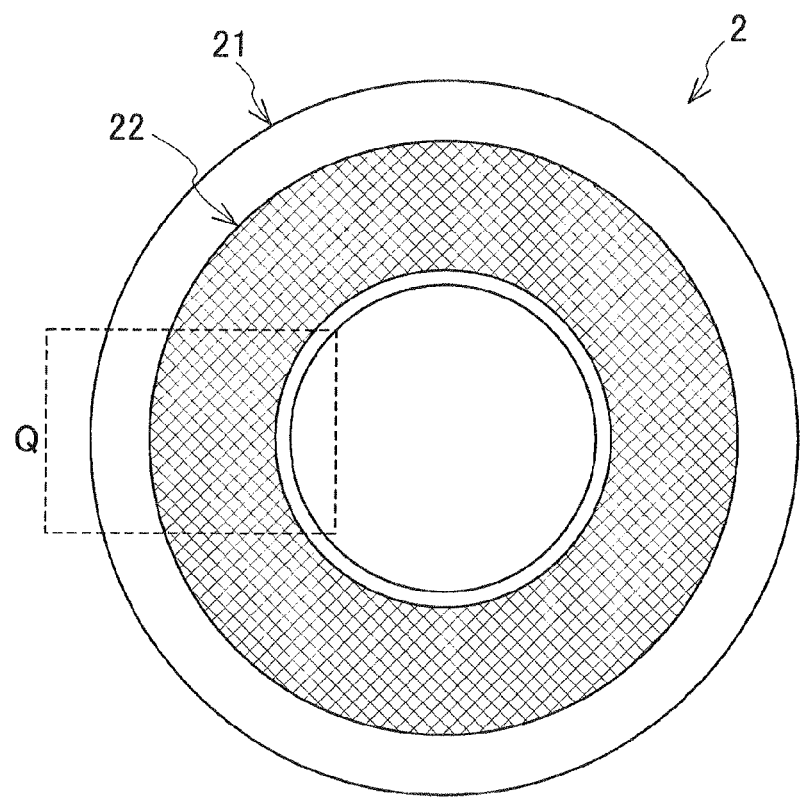
FIG. 2 shows a schematic plan view of a stator in the first embodiment.
Figure 3:
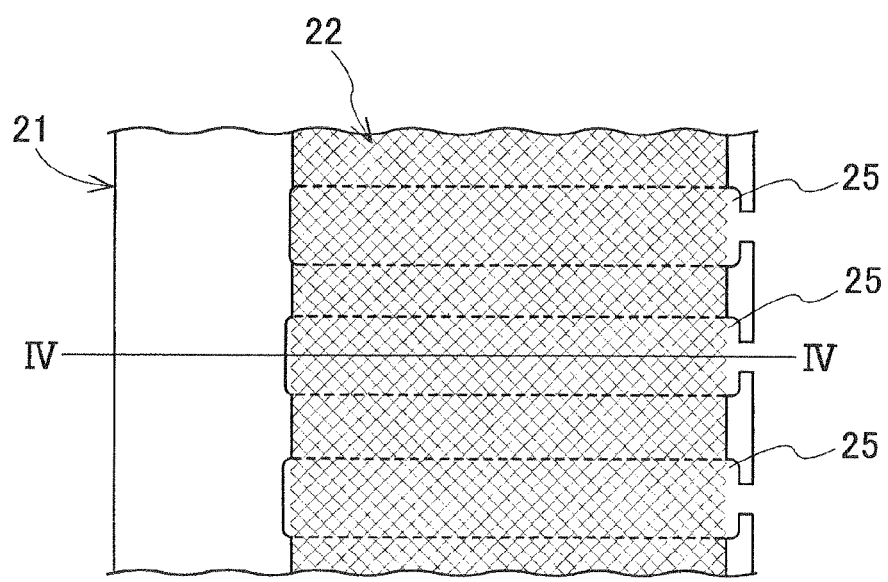
FIG. 3 shows an enlarged view of a portion Q in FIG. 2.

As shown in FIG. 1, the rotary electric machine 1 is constituted by including a stator 2 that acts as an armature, a rotor 3 that acts as a magnetic field, a front housing 4a and a rear housing 4b joined and fixed by a fastening bolt 4c to accommodate the stator 2 and the rotor 3 therein, a rectifier 5 that converts AC power into DC power, and the like.

The stator 2 includes a stator core 21, a segmented stator winding 22 constituted by a plurality of conductor segments 23, and an insulating sheet member 24 that electrically insulates between the stator core 21 and the stator winding 22.

The stator 2 is fixed by being sandwiched between the front housing 4a and the rear housing 4b, and is disposed on an outer surface side of the rotor 3 with a predetermined air gap therebetween.

A detailed structure of the stator 2 will be described later.

The rotor 3 rotates together with a shaft 33 that is rotatably supported by the front housing 4a and the rear housing 4b, and includes a Lundell-type pole core 32 and a field winding 31.

In addition, a pulley 20 connected to an engine (not shown) mounted on an automobile via a belt or the like (not shown) is fixed to a front (the left side in FIG. 1) end portion of the shaft 33.

The Lundell-type pole core 32 is configured by combining a pair of front and rear side pole cores 32a and 32b.

Each pole core 32a, 32b has six pieces of claw-shaped magnetic pole portions 32c, and is fitted to the shaft 33 so as to sandwich the field winding 31, which is configured by winding an insulated copper wire concentrically and cylindrically, from the front and the rear.

In the present embodiment, the pole cores 32a, 32b have eight magnetic poles, respectively, i.e., form the rotor 3 of sixteen poles.

Intake ports 42a, 42b are disposed on an end surface in an axial direction (front end surface) of the front housing 4a and on an end surface in an axial direction (rear end surface) of the rear housing 4b, respectively.

A mixed flow fan 35 for discharging the cooling air introduced from the front side intake port 42a in the axial and radial direction is fixed to a front end surface of the front side pole core 32a by welding or the like.

Similarly, a centrifugal fan 36 for discharging the cooling air introduced from the rear side intake port 42b in the radial direction is fixed to the rear end surface of the rear side pole core 32b by welding or the like.

Further, discharge ports 41 of the cooling air are disposed on the front housing 4a and the rear housing 4b in positions facing coil end portions of the stator winding 22 projecting from both ends in the axial direction of the stator core 21.

Slip rings 37 and 38 electrically connected to both ends of the field coil 31 is formed in a rear end (the right side in FIG. 1) vicinity of the shaft 33, and the power is supplied to the coil 31 from a brush device 7 via the slip rings 37 and 38.

In the AC generator having the configuration described above, the rotor 3 rotates in a predetermined direction together with the shaft 33 when a rotational force from the engine is transmitted to the pulley 20 via the belt or the like.

In this state, each claw-shaped magnetic pole portion 32c of the pole cores 32a and 32b is excited by applying an excitation voltage to the field coil 31 of the rotor 3 from the brush device 7 via the slip rings 37 and 38, thus NS magnetic poles are formed alternately along a rotation direction of the rotor 3.

Thereby, the three-phase AC voltage can be generated in the stator winding 22, and a predetermined DC current from an output terminal of the rectifier 5 can be retrieved.

Next, details of the stator 2 will be described with reference to FIG. 2 to FIG. 8.

The stator core 21 is formed by stacking a plurality of annular electromagnetic steel plates in the axial direction.

A plurality of slots 25, each has a substantially rectangular cross section, for accommodating the multi-phase stator windings 22 are formed in an inner surface of the stator core 21 penetrating in the axial direction.

In the present embodiment, ninety-six slots 25 corresponding to sixteen magnetic poles of the rotor 3 are disposed at equal intervals in the circumferential direction so as to accommodate the two sets of three-phase stator windings 22.

Figure 5:
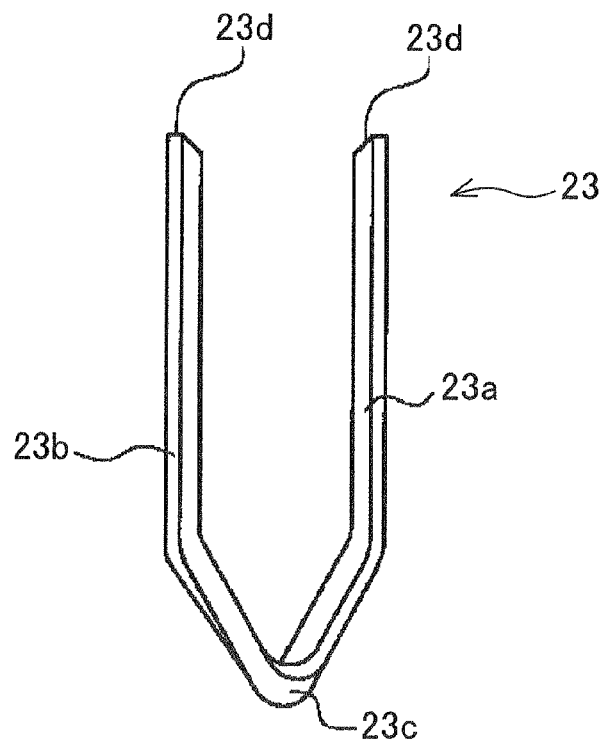
FIG. 5 shows a perspective view of a conductor segment that constitutes a stator winding in the first embodiment.

As shown in FIG. 5, the conductor segment 23 that constitute the stator winding 22 has a substantially U-shape formed by bending a plate-like or rod-like metal (e.g., copper) at a turn portion 23c.

The conductor segment 23 includes an inner layer-side conductor section 23a disposed on an inner surface side than the turn section 23c of the slot 25, and an outer layer-side conductor section 23b disposed on an outer surface side than the turn section 23c of slot 25.

Further, each of the inner-side conductor section 23a and the outer layer-side conductor section 23b thereof is constituted by an inner conductor as a straight portion to be accommodated in the slot 25 of the stator 2 and an outer conductor exposed outside the slot 25.

The stator winding 22 is constituted by inserting two conductor segments 23 into each slot 25 of the 21 stator core from one side in the axial direction, and connecting end portions 23d of the conductor segments 23 inserted in different slot 25.

Figure 6:
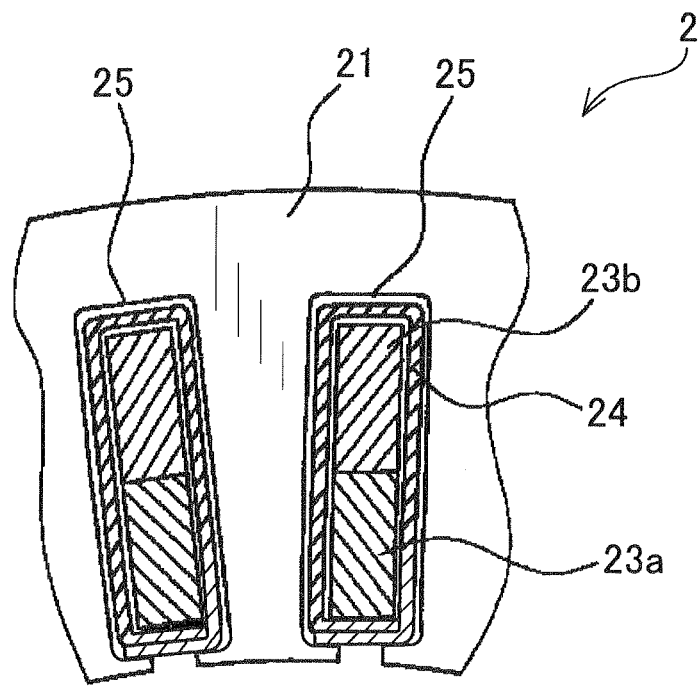
FIG. 6 shows a partial sectional view of the stator in the first embodiment.

As shown in FIG. 6, a sectional shape of each of the inner side conductor section 23a and the outer layer-side conductor section 23b of the conductor segments 23 has a rectangular shape longer in the radial direction than the circumferential direction, and longer sides of the rectangle are disposed along the radial direction.

Figure 7:
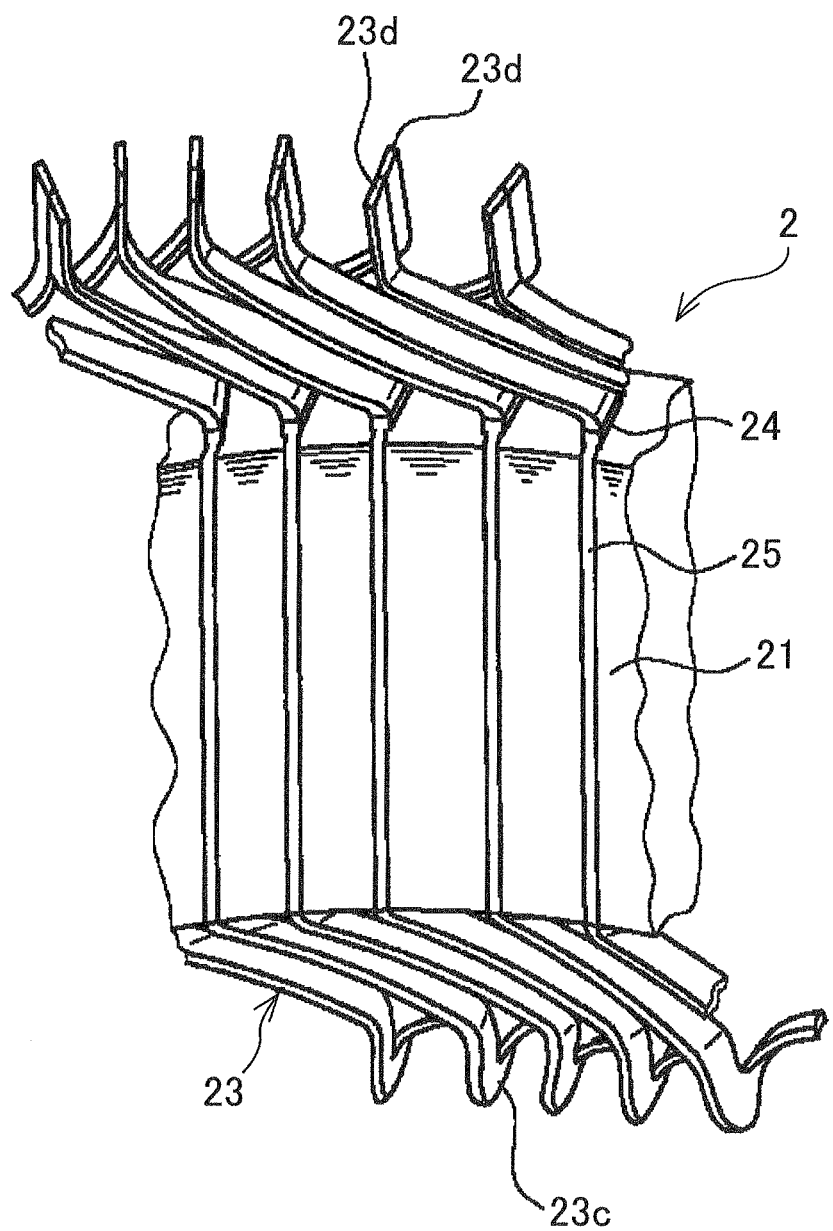
FIG. 7 shows a partial perspective view of coil ends in both end surfaces of the stator in the first embodiment.

As shown in FIG. 7, the end portions 23d of the adjoining conductor segments 23 positioned opposite to the coil end formed by the turn sections 23c are bent in the circumferential direction opposite to each other, and the end of portions 23d of the conductor segments 23 in the different layer are connected and joined.

An insulating film is formed on a surface of the conductor segments 23, and insulation between adjoining conductors segments 23 is performed by the insulating film formed on the surface of each conductor segment 23.

In addition, electrical insulation between an inner wall surface of the slot 25 and the conductor segments 23 is performed by the insulating sheet member 24 disposed along the inner wall surface of each slot 25.

As shown in FIG. 8A to FIG. 8D, the insulating sheet member 24 is made of a rectangular insulating paper.

Four bend lines 24a extending in the axial direction are formed on the insulating sheet member 24 beforehand so that the insulating sheet member 24 can be bent in a rectangular cylindrical shape to match a sectional shape of the slot 25.

The bend lines 24a may be formed easily by pressing an edge of a cutting tool on the insulating sheet member 24, for example.

The length L2 of the bend line 24a formed on the insulating sheet member 24 from a reference position S1 in a central section of the insulating sheet member 124 in the axial direction (a center in the axial direction in the present embodiment) to a tip 24b in the axial direction is configured shorter than the length L1 from the reference position S1 to an axial end (i.e., an end in the axial direction) of the sheet member 24.

That is, the four bend lines 24a do not reach the both axial ends of the insulating sheet member 24 (both sides in a vertical direction of FIG. 8A).

Thus, as shown in FIG. 8D and FIG. 8C, the bend line 24a that might become an origin when a tear occurs is prevented from being formed on either end of the insulating sheet member 24.

In the present embodiment, the axial length (i.e., the length in the axial direction) from one end to another end of the bend line 24a (2×L2) is made slightly longer than the axial length of the stator core 21.

The insulating sheet member 24 is formed into the rectangular cylindrical shape to match the sectional shape of the slot 25 by folded along the four bend lines 24a, then is inserted in each slot 25 in the axial direction, and is disposed along the inner wall surface of each slot 25.

The end portions in the circumferential direction of the insulating sheet member 24 formed into the rectangular cylindrical shape are overlapped, and this overlapped portion is positioned on the inner surface side of the slot 25 (refer to FIG. 6).

Figure 4:
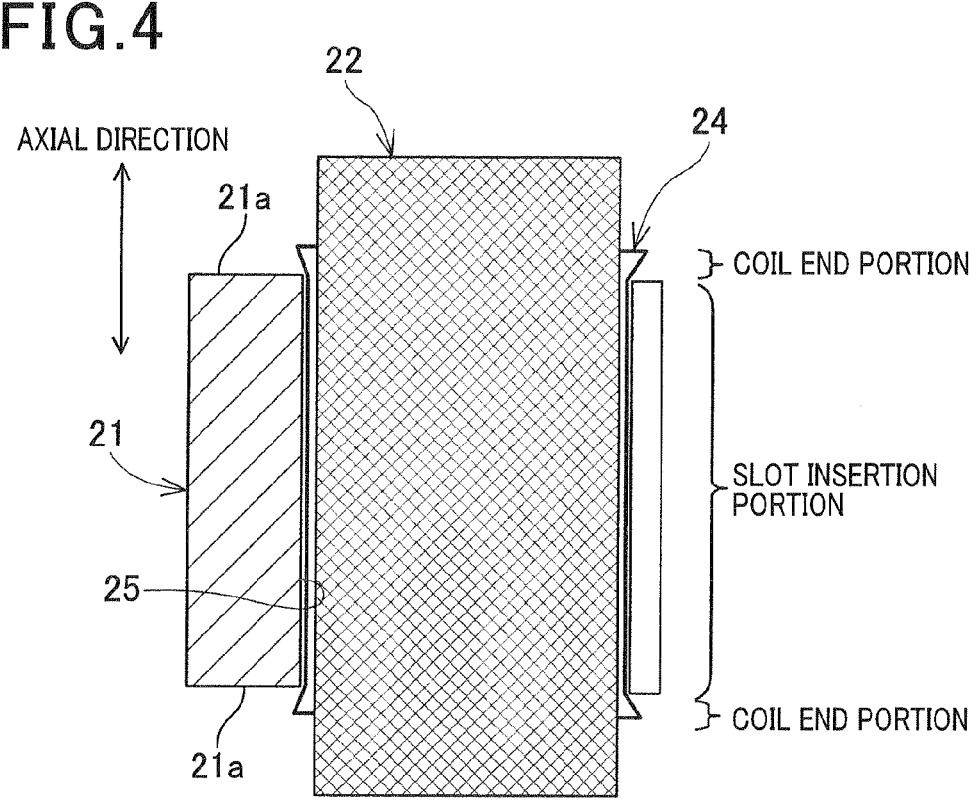
FIG. 4 shows a sectional view taken along line IV-IV in FIG. 3.

In this case, the insulating sheet member 24 is disposed in a condition where both axial ends thereof are projected outside the slot 25 from the end surfaces 21a in the axial direction of the stator core 21, as shown in FIG. 4.

The one end in one axial side (i.e., one side in the axial direction) of the insulating sheet member 24 disposed in a manner mentioned above is compressed by the turn section 23c when the conductor segments 23 are inserted from one axial side to each slot 25, or the other end in the other axial side of the insulating sheet member 24 is pulled by obliquely passing sections when the obliquely passing sections are formed by the adjoining end portions 23d of the conductor segments 23 extending from the slots 25 to the other axial side being bent in the circumferential direction opposite to each other.

However, the bend line 24a that becomes the origin when the tear occurs is not formed on the axial ends of the insulating sheet member 24, an occurrence of the tears in both axial ends of the insulating sheet member 24 is prevented more reliably.

According to the rotary electric machine 1 of the present embodiment configured as described above, the axial length L2 of the bend line 24a formed on the insulating sheet member 24 from the reference position S1 in the central section of the insulating sheet member 24 to the tip 24b is configured shorter than the axial length L1 from the reference position S1 to the end of the sheet member 24, and the bend line 24a that becomes the origin when the tear occurs is not formed on the axial ends of the insulating sheet member 24.

Therefore, the occurrence of the tears in both axial ends of the insulating sheet member 24 is prevented more reliably, and good insulation by the insulating sheet member 24 is ensured more reliably.

[First Modification]

Figures 9A, 9B:
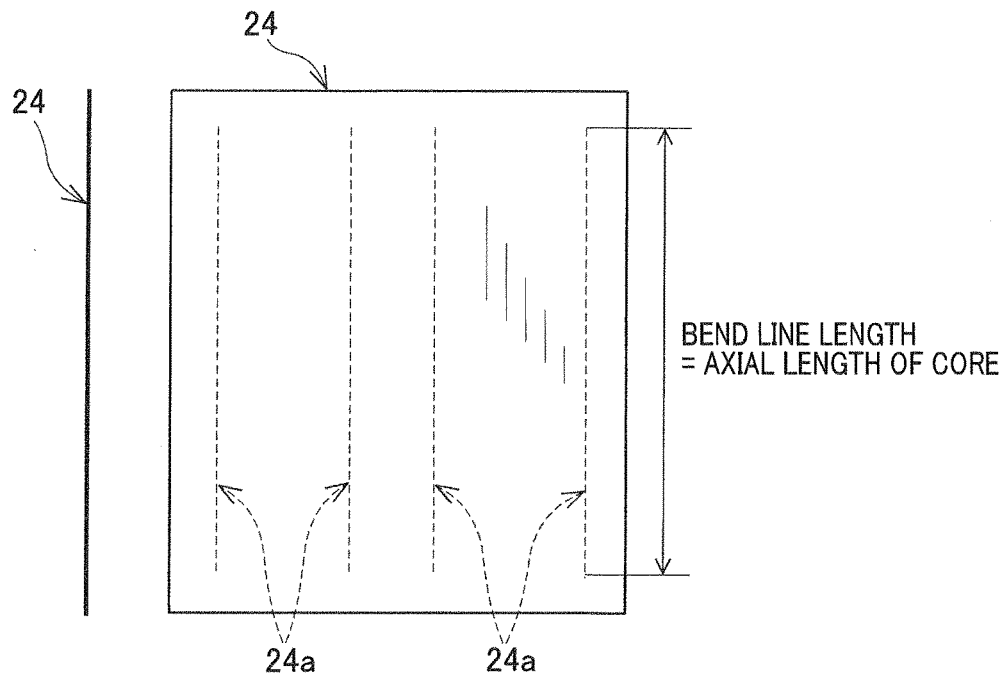
FIG. 9A shows a plan view of an insulating sheet member in a first modification.
FIG. 9B shows a side view of the insulating sheet member in the first modification.

In the first embodiment described above, although the axial length of the four bend lines 24a formed on the insulating sheet member 24 from one end to the other end (2×L2) is configured a bit longer than the axial length of the stator core 21, the axial length of the bend line 24a from one end to the other end (2×L2) may be the same length with the axial length of the stator core 21 as shown in FIG. 9A and FIG. 9B.

Figure 10:
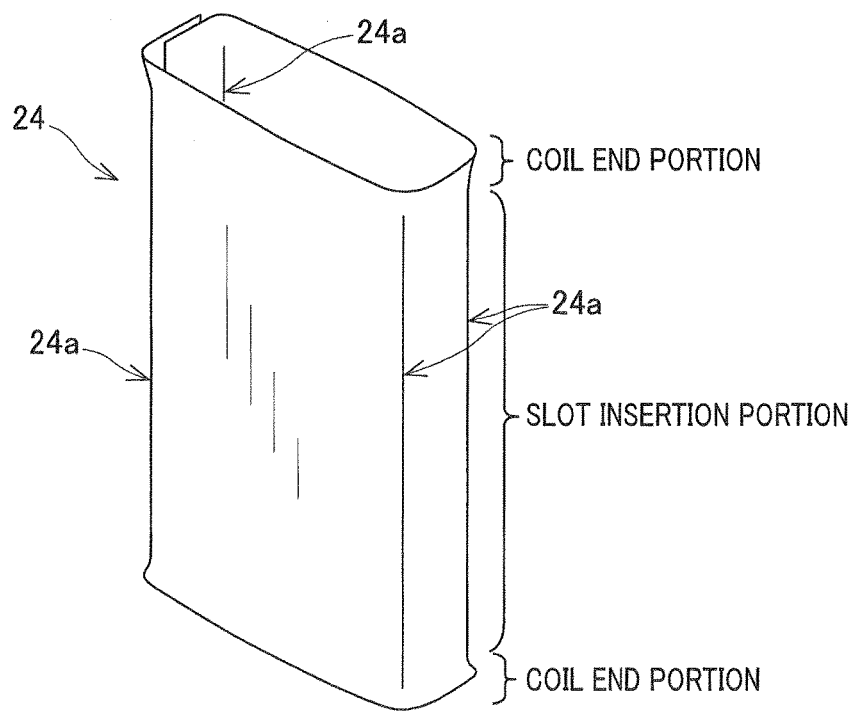
FIG. 10 shows a perspective view of an insulating sheet member bent in a tubular shape in a second modification.

In this way, as shown in FIG. 10, a slot insertion portion that is a portion where the bend lines 24a are formed and the coil end portion that is a portion where the bend lines 24a are not formed may have different shapes in the insulating sheet member 24 formed into the rectangular cylindrical shape.

That is, since it becomes possible to make the coil end portions of the axial ends of the insulating sheet member 24 into a tapered shape that opens outwardly, the displacement in the axial direction of the insulating sheet member 24 disposed in the slot 25 can be prevented effectively.

[Second Embodiment]

In the rotary electric machine according to the second embodiment, the basic configuration is the same as that of the first embodiment; only the configuration of an insulating sheet member 124 is different from that of the first embodiment.

Therefore, in the second embodiment, components identical with or similar to those in the first embodiment are given the same reference numerals, and structures and features thereof will not be described in order to avoid redundant explanation.

As shown in FIG. 11A to FIG. 11D, the insulating sheet member 124 according to the second embodiment is made of a rectangular insulating paper.

The insulating sheet member 124 is different from the first embodiment in that it has a folded portion 124b folded back in the axial direction formed in one axial end of the insulating sheet member 124.

Figure 12:
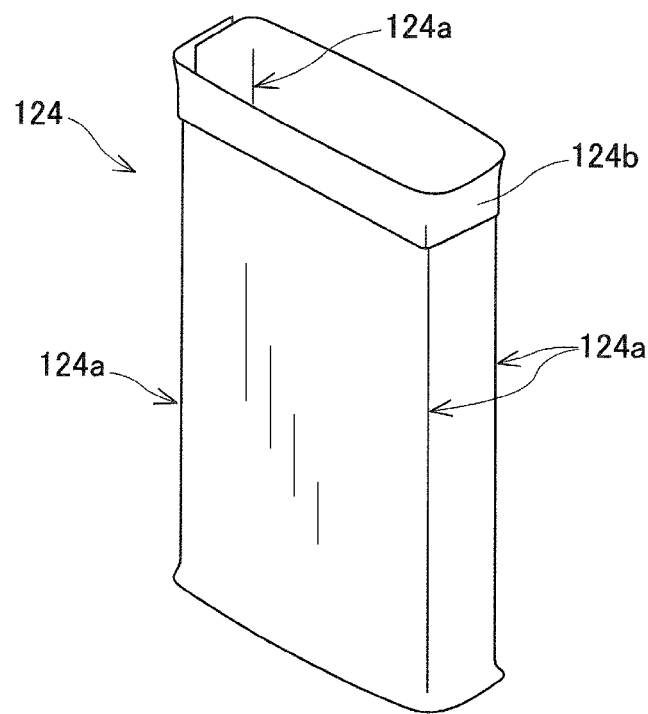
FIG. 12 shows a perspective view of an insulating sheet member bent in a tubular shape in the second embodiment.

As shown in FIG. 12, when the insulating sheet member 124 is folded in the rectangular cylindrical shape to match the sectional shape of the slot 25, the folded portion 124b is folded so that it positions outside the insulating sheet member 124.

In the case where the insulating sheet member 124 is inserted into the slot 25 of the stator core 21, the end where the folded portion 124b is not formed is inserted first in the axial direction with respect to the slot 25.

At this time, the folded portion 124b positioned in the rear side functions as a positioning section by contacting with the insertion-side end surface of the stator core 21.

Further, the folded portion 124b may be positioned either in the insertion-side to the slot 25 of the conductor segments 23 forming the stator winding 22 or in the non-insertion-side.

However, by positioning the folded portion 124b in the non-insertion-side of the conductor segments 23, the folded portion 124b is to be positioned in a side forming the obliquely passing sections where the ends of the conductor segments 23 are bent in the circumferential direction.

Therefore, since the insulating sheet member 124 is reinforced in part by the folded portion 124b, it is possible to more reliably prevent the occurrence of tears in the insulating sheet member 124 when bending the conductor segments 23.

Four bend lines 124a extending in the axial direction are formed on the insulating sheet member 124 beforehand so that the insulating sheet member 124 can be bent in the rectangular cylindrical shape easily.

The length L2 of the bend line 124a from a reference position S2 in a center of the insulating sheet member 124 in the axial direction to a tip 124c in the axial direction is configured shorter than the length L1 from the reference position S1 to an axial end of the sheet member 124 as in the case of the first embodiment.

Thus, as shown in FIG. 11C and FIG. 11D, the bend line 124a that might become an origin when a tear occurs is prevented from being formed on the both axial ends of the insulating sheet member 124.

According to the rotary electric machine of the second embodiment configured as described above, the axial length L2 of the bend line 124a formed on the insulating sheet member 124 from the reference position S2 in the central section of the insulating sheet member 124 to the tip 124c is configured shorter than the axial length L1 from the reference position S2 to the end of the sheet member 124.

As a result, the same function and effect as in the first embodiment, such as preventing the occurrence of the tears in both axial ends of the insulating sheet member 124 more reliably is performed.

In particular, in the second embodiment, since the insulating sheet member 124 has the folded portion 124b folded back in the axial direction formed in one axial end thereof, the insulating sheet member 124 is reinforced in part by the folded portion 124b. Therefore, it is possible to prevent the occurrence of tears in the axial ends of the insulating sheet member 124 more reliably.

In addition, the folded portion 124b may be provided to both axial ends.

[Third Embodiment]

In the rotary electric machine according to the second embodiment, the basic configuration is the same as that of the first embodiment; only the configuration of an insulating sheet member 224 is different from that of the first embodiment.

Therefore, in the third embodiment, components identical with or similar to those in the first embodiment are given the same reference numerals, and structures and features thereof will not be described in order to avoid redundant explanation.

Figures 13A, 13B:
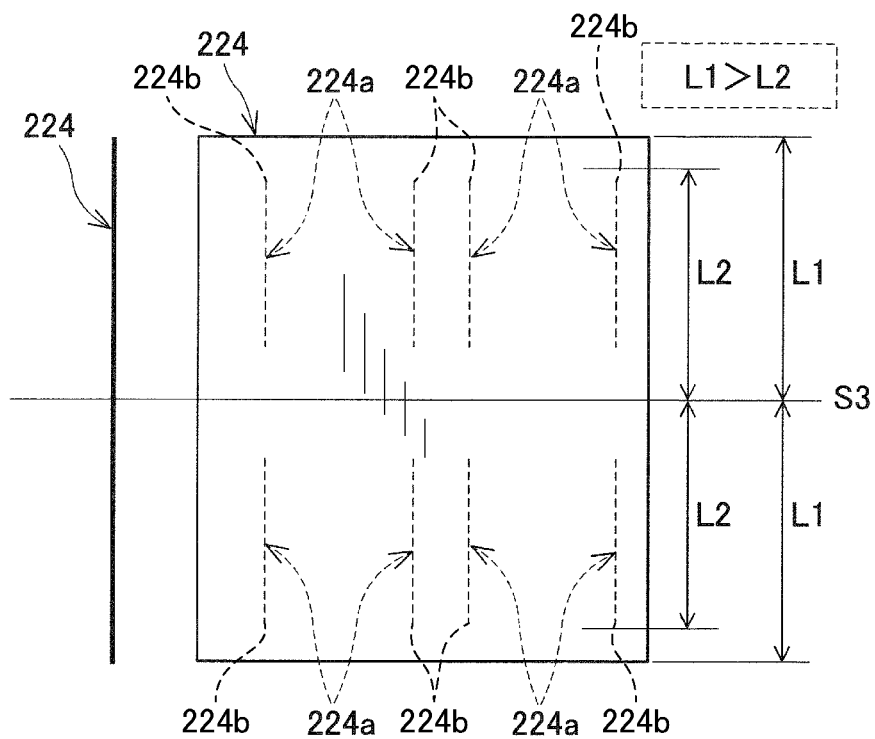
FIG. 13A shows a plan view of the insulating sheet member used in the third embodiment.
FIG. 13B shows a side view of the insulating sheet member used in the third embodiment.

As shown in FIG. 13A and FIG. 13B, the insulating sheet member 224 according to the third embodiment is made of a rectangular insulating paper.

As in the case of the first embodiment, four bend lines 224a extending in the axial direction are formed on the insulating sheet member 224 beforehand so that the insulating sheet member 224 can be bent in a rectangular cylindrical shape to match a sectional shape of the slot 25.

However, the third embodiment is different from the first embodiment in that the four bend lines 224a are formed separately into two in the axial direction, and are spaced apart axially from each other.

That is, in the third embodiment, a portion where no bend line 224a is formed is present between the two bend lines 224a formed separately in the axial direction.

The portion where no bend line 224a is formed abuts strongly on an inner wall surface of the slot 25 than the portion where the bend line 224a is formed when the insulating sheet member 224 is inserted into the slot 25.

Therefore, the displacement of the insulating sheet member 224 or the insulating sheet member 224 slipping out from the slot 25 can be prevented.

According to the rotary electric machine of the third embodiment configured as described above, the axial length L2 of the bend line 224a formed on the insulating sheet member 224 from the reference position S3 in the central section of the insulating sheet member 224 to a tip 224b is configured shorter than the axial length L1 from the reference position S1 to the end of the sheet member 224.

As a result, the same function and effect as in the first embodiment, such as preventing the occurrence of the tears in both axial ends of the insulating sheet member 224 more reliably is performed.

In particular, in the third embodiment, the four bend lines 224a formed on the insulating sheet member 224 are formed separately into two in the axial direction, and are spaced apart axially from each other.

Therefore, the portion where no bend line 224a formed in a central section abuts strongly on the inner wall surface of the slot 25 when the insulating sheet member 224 is bent in the rectangular cylindrical shape and inserted into the slot 25.

Therefore, it becomes possible to prevent the displacement of the insulating sheet member 224 or the insulating sheet member 224 slipping out from the slot 25.

In addition, the four bend lines 224a may be separated into three or more bend lines in the axial direction.

[Other Embodiment]

The present disclosure is not limited to the above-mentioned embodiments and can be variously changed in the range which does not deviate from the object of the present disclosure.

For example, although the reference positions S1, S2, S3 of the insulating sheet members 24, 124, 224 are configured in the center in the axial direction in the above embodiment, the reference positions may be configured in arbitrary positions in intermediate portions in the axial direction.

Further, although the stator winding 22 of the above embodiment has a two-layer structure with the inner-side conductor portion 23a and the outer layer-side conductor section 23b aligned in the radial direction within the slot 25 of the stator core 21, the stator winding 22 may have a multi-layer structure with three or more layers of electrical conductors disposed in the radial direction.

Further, although the conductor segments 23 forming the stator winding 22 employ the U-shaped segments in the above embodiment, I-shaped conductor segments may be employed instead.

Moreover, the stator windings 22 may be formed not by connecting the plurality of conductor segments 23, but may be formed with a continuous wire.

Furthermore, a round wire with a circular or elliptical cross-section shape may be employed for conductor wires that constitute the stator winding 22 in addition to a flat square wire having a rectangular cross-section.

Moreover, although the above-mentioned embodiments explained the examples that the rotary electric machine regarding the present disclosure is applied to the AC generator for the vehicles, the present disclosure can be used also for a generator or an electric motor, and also for the rotary electric machine that can use the both alternatively as the rotary electric machine installed in the vehicles.

What is claimed is:

1. A rotating electrical machine comprising:
    a rotor, and
    a stator that has a stator core and a stator winding; wherein,
    the stator core is disposed in a radial direction facing the rotor and has a plurality of slots extending in an axial direction, and arranged in a circumferential direction;
    the stator winding is wound around the stator core as a plurality of electrical conductors and is aligned in the radial direction in the slots;
    the stator has an insulating sheet member that is bent in a rectangular cylindrical shape to match a sectional shape of the slot, and is intervened between the electrical conductor and an inner wall surface of the slot;
    a length of a bend line formed extending in the axial direction on the insulating sheet member from a reference position in a central section of the insulating sheet member in the axial direction to a tip in the axial direction is configured shorter than a length from the reference position to an end in the axial direction of the sheet member,
    the bend line is formed separately into a plurality of bend lines in the axial direction,
    the bend lines are spaced apart in the axial direction from each other,
    the insulating sheet member is folded only along the bend lines, and
    a portion wherein no bend line is formed is present between two of the bend lines formed separately in the axial direction.

2. The rotating electrical machine according to claim 1, wherein,
    the length of the bend lines in the axial direction is the same as a length of the stator core in the axial direction.

3. The rotating electrical machine according to claim 2, wherein,
    the insulating sheet member has a folded portion folded back in the axial direction formed in at least one end in the axial direction of the insulating sheet member.

4. The rotating electrical machine according to claim 1, wherein,
    the insulating sheet member has a folded portion folded back in the axial direction formed in at least one end in the axial direction of the insulating sheet member.

5. The rotaing electrical machine according to claim 1, wherein
    the insulating sheet member is folded along the bend line to match the sectional shape of the slot.

6. The rotating electrical machine according to claim 1, wherein
    the portion where no bend line is formed extends along an entire length of the two of the bend lines.

* * * * *